United States Patent [19]

Zimmerman

[11] Patent Number: 4,607,200

[45] Date of Patent: Aug. 19, 1986

[54] COFFEE GRINDER

[75] Inventor: John D. Zimmerman, Springfield, Ill.

[73] Assignee: Bunn-O-Matic Corporation, Springfield, Ill.

[21] Appl. No.: 752,572

[22] Filed: Jul. 8, 1985

[51] Int. Cl.[4] .......................... H02P 1/10; B02C 19/12
[52] U.S. Cl. .................................... 318/484; 318/445; 318/446; 241/33
[58] Field of Search ............... 318/445, 446, 484, 306; 200/85 R, 61.85, 153 T, 153 K, 157, 329, 330, 339; 241/33, 36, 63, 64; 361/192, 193, 194

[56] References Cited

U.S. PATENT DOCUMENTS

| | | | |
|---|---|---|---|
| 2,496,574 | 2/1950 | Boger | 318/484 X |
| 3,424,919 | 1/1969 | Howlett | 318/446 X |
| 3,958,164 | 5/1976 | Hess | 318/446 X |
| 4,037,068 | 7/1977 | Gaynor | 200/339 X |
| 4,490,659 | 12/1984 | Hansen | 318/484 |
| 4,491,905 | 1/1985 | Arakawa | 318/446 X |

FOREIGN PATENT DOCUMENTS

| | | | |
|---|---|---|---|
| 2720724 | 11/1978 | Fed. Rep. of Germany | 200/339 |
| 2368790 | 6/1978 | France | 200/153 K |
| 57-83179 | 5/1982 | Japan | 318/306 |

Primary Examiner—William M. Shoop, Jr.
Assistant Examiner—Bentsu Ro
Attorney, Agent, or Firm—Lockwood, Alex, FitzGibbon & Cummings

[57] ABSTRACT

A coffee grinder has a control circuit for its electric grinder motor which includes a three-position control switch having a resident "Off" position, a resident "On" position, and a non-resident or momentary "On plus Start" position. In the "Off" position power is interrupted to all circuits of the grinder. The "On" position is a resting position which is resumed after the start of each grind cycle in readiness for the start of another grind cycle. The "On plus Start" position is momentary and in which a relay is energized so as to complete a circuit that energizes the grinder motor. In one type of coffee grinder the electrical control circuit includes a timer which can be set to determine the length of the grinding cycle. In another type of coffee grinder the length of the grinding cycle is determined by the presence of a ground coffee receiving bag or other container. In both types of grinders the normal grinding cycle can be terminated by placing control switch in its "Off" position.

7 Claims, 8 Drawing Figures

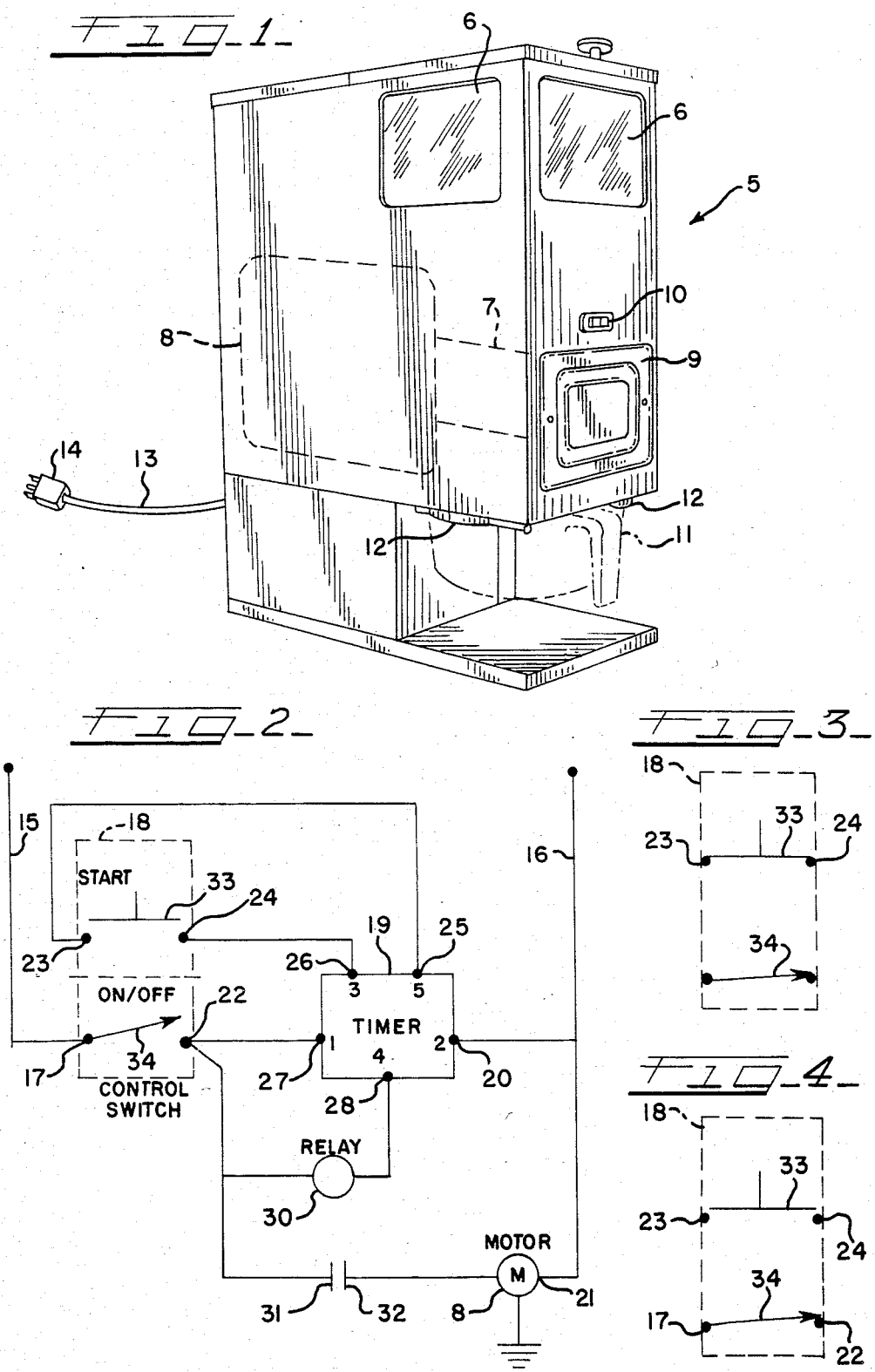

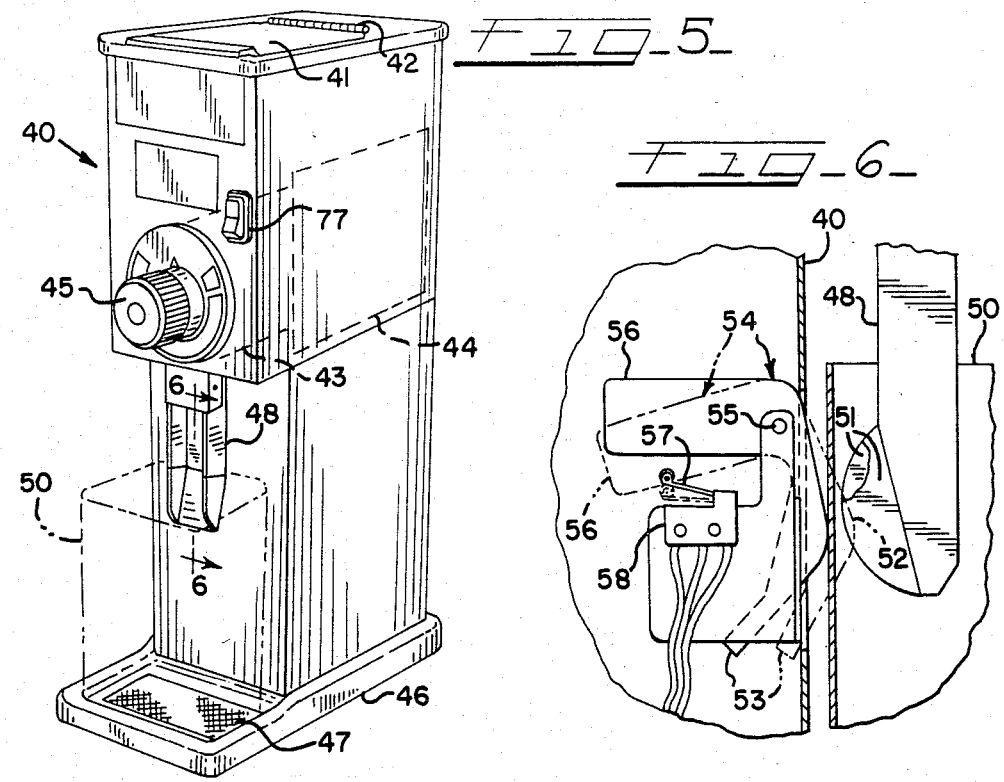
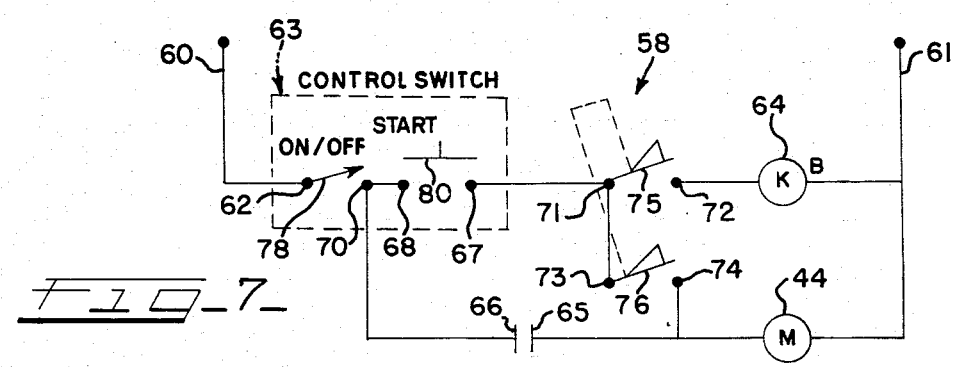
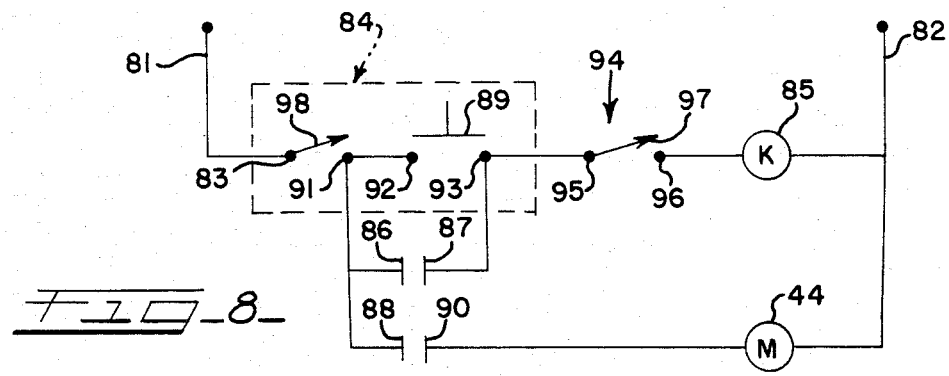

COFFEE GRINDER

This invention relates generally to innovations and improvements in coffee bean grinders. More particularly, it relates to innovations and improvements in electrical control circuits for coffee grinders. Coffee grinders of one type are particularly suited for use in restaurants, institutions and other large coffee-consuming facilities wherein there are prolonged periods during which the grinder will be left unattended and other prolonged periods during which the grinders will be called upon at more or less frequent intervals, depending upon demand, to grind enough coffee to brew a batch of coffee. Coffee grinders of another type are suited for use in retail establishments where customers typically grind one to three pounds of coffee beans so as to purchase fresh ground coffee as an alternative to coffee packed in sealed cans.

Normally, there will be prolonged periods during which coffee grinders will be left unattended and other prolonged periods during which the coffee grinders will be called upon at more or less frequent intervals, depending upon the demand. During such prolonged periods and at other times, such as when a stoppage occurs or a user wants to terminate a grind cycle, there is a requirement to completely deactivate a grinder and deenergize all electrical circuits.

Having the foregoing in mind, the object of the invention, generally stated, is the provision of coffee grinders which have three-mode control circuits for their electric grinder motor which include a three-condition control switch having an "Off" condition in which it will reside until positively changed, with power interrupted to all circuits of the grinder, and "On" condition in which it will reside until positively changed to another condition, and a "On plus Start" condition in which all circuits are energized and which will be occupied only so long as manually retained therein and upon release will automatically shift to the "On" condition.

An important object of the invention is the provision of coffee grinders in which the normal grinding cycle or period can be terminated at will by putting a three-mode control switch of "Off", "On" and "On plus Start" in its "Off" position.

A more specific object of the invention is the provision of a precision coffee grinder in which the electrical control circuit includes a timer which upon being started will energize the grinder motor for a predetermined period of time so as to grind a precise quantity of coffee beans.

Another specific of the invention is the provision of a coffee grinder in which the electrical control circuit includes a switch which is normally open and is closed when a bag is positioned to receive ground coffee from the grinder.

Certain other important objects of the invention will become apparent to those skilled in the art in view of the following description of a preferred embodiment taken with the accompanying drawings in which:

FIG. 1 is a perspective view of a coffee grinder incorporating one embodiment of the present invention;

FIG. 2 is a circuit diagram of the coffee grinder of FIG. 1 with the operating switch and the circuit being in the "Off" condition;

FIG. 3 is a diagramatic view showing the condition of the operating switch of the grinder of FIGS. 1 and 2 in its "Start" condition;

FIG. 4 is a diagramatic view illustrating the condition of the operating switch in its "On" condition.

FIG. 5 is a perspective view of a coffee grinder incorporating another embodiment of the present invention;

FIG. 6 is an enlarged fragmentary sectional view taken on line 6—6 of FIG. 5 and showing a bag actuated switch forming part of the grinder of FIG. 5;

FIG. 7 is a circuit diagram of the coffee grinder of FIG. 5 with the circuit in its "Off" mode or condition; and FIG. 8 is a diagram of a circuit that may be used in place of the circuit shown diagramatically in FIG. 7.

In FIG. 1 a coffee grinder is indicated generally at 5 which has a hopper for roasted coffee beans in its upper portion which is provided with windows 6—6 through which the beans can be viewed. On the interior there is a grinder mechanism 7 which is driven by an electric motor 8. The motor-grinder combination is of known type and the details thereof do not form part of the present invention. A removable plate 9 is located on the front panel of the grinder 5 which on removal provides access to adjustments for setting the type of grind. The length of grind is adjusted by setting a timer 19 (FIG. 2) also reached by removing plate 9. Also in the front panel there is located a pivoted lever or button 10 which serves to actuate a three-condition switch 18 (FIG. 2) which forms part of the electrical circuit for the motor 8 as will be discussed in detail below. Removal of the plate 9 also allows access to the switch 18.

The grinder mechanism 7 operates to grind coffee beans and discharge the ground coffee into a brewing funnel indicated in broken line at 11 which is removably supported underneath the ground coffee discharge by a pair of support clips 12—12.

The grinder 5 is of a type which is particularly suited for use in restaurants, institutional dining facilities and other large coffee consuming facilities wherein the grinder will be left unattended for prolonged periods and then during other prolonged periods will be repeatedly called on to grind separate batches of coffee for more or less immediate use in a coffee brewer to prepare batches of coffee depending upon demand. During the prolonged periods when the grinder 5 is unattended, all of the electrical circuits thereof should be disconnected so as to prevent the grinder from being inadvertently turned on and its grind cycle started. On the other hand, when there is a demand for batches of ground coffee, then the employees and attendants should be able to operate the grinder without having to have any specialized instruction for doing so.

The control circuit by which the foregoing requirements and objectives can be achieved for grinder 5 is shown and illustrated in FIGS. 2-4. Normally, the grinder motor 8 will be energized from a source of 120 volts alternating current through a suitable connector cord 13 (FIG. 1) having a conventional three-prong connector plug 14 on the end which is adapted to be inserted into a conventional three-socket receptacle. The two live conductors are indicated in FIG. 2 at 15 and 16. The conductor 15 is connected with one terminal 17 of a three-position control switch of known type which is indicated diagramatically at 18. The conductor 16 is connected with one terminal 20 of a timer 19 of known commercial type and also to one terminal 21 of the motor 8.

The switch 18 has three terminals in addition to terminal 17 the three being indicated at 22, 23 and 24. The timer 19 has four terminals in addition to terminal 20 the four being designated at 25, 26, 27, and 28.

The three-mode control circuit for the grinder motor 8 includes in addition to the components above mentioned, a relay 30 of known type which includes a coil which upon energization and deenergization closes and opens a pair of contacts 31 and 32. The switch 18, timer 19, relay 30, and motor 8 can all be of known commercial type.

The switch 18 of the control circuit has three positions, namely, "Off", "On", and "On plus Start". In FIG. 2, the switch 18 is shown in its "Off" position. Thus, the contact 33 which is engageable with the terminals 23 and 24 is in its raised or open position and the switch contact 34 which is engageable with the terminal 22 is also in its raised position out of contact with the terminal 22. In this condition of the switch 18 which is the "Off" position, it will be seen that none of the components of the control circuit for the grinder 5 is energized.

In FIG. 3 the switch 18 is shown in its "On plus Start" condition. The contact 33 is in engagement with the terminals 23 and 24 thereby interconnecting the same while the switch contact 34 is in contact with the terminal 22 thereby interconnecting the terminals 17 and 22. In this condition of the switch 18 it will be seen that all components of the control circuit shown in FIG. 2 are energized. Further, it will be understood that upon energization of the relay 30 the contacts 31 and 32 are closed thereby energizing and starting the motor 8.

The switch 18 is actuated from its "Off" position shown in FIG. 2 to its "On plus Start" position shown in FIG. 3 by manipulating the switch lever or button 10 (FIG. 1). In actuating the switch 18 from its "Off" position shown in FIG. 2 to its "On plus Start" position shown in FIG. 3 the switch 18 passes through its "On" condition illustrated in FIG. 4. In this condition, the contact 33 is separated from the terminals 23 and 24 while the switch contact 34 remains in contact with the terminal 22. Preferably, the switch 18 is of the type that the actuating lever 10 is spring loaded so upon releasing the pressure on the same when it is in the "On plus Start" position it will automatically resume the "On" position shown in FIG. 4.

It will be appreciated that after the switch 18 resumes the "On" condition or position from the "On plus Start" position the relay contacts 31 and 32 will remain engaged until the timer 19 times out. When this occurs, the relay 30 will be deenergized and the contacts 31 and 32 will open thereby deenergizing the motor 8. Accordingly, there is no need for an attendant or operator to specifically move the actuating lever 10 of the switch to an "Off" position after the grinding cycle has been started by depressing the lever 10 to the "Start" position. However, if there is at any time a need or desire to terminate a normal grinding cycle, this can be done at will by putting switch 18 in its "Off" position. For example, it may be desired to change the fineness of the grind, to grind a smaller amount, to remove a foreign object, etc.

In a normal operating cycle, the operator will insert a disposable filter liner in the funnel 11 and place the funnel in the grinder in position to receive ground coffee beans as shown in FIG. 1. The operator then will manipulate the switch lever 10 so as to move it from its "Off" position through its intermediate or "On" position to its depressed "Start" position. Upon release, the lever 10 resumes its "On" position intermediate its "Off" and "On plus Start" positions. The operator then can stand aside and allow the grinder 5 to operate for whatever predetermined time or cycle that the timer 19 has been set for. After the grinding cycle has ceased, the operator will remove the funnel 11 in which a precision amount of fresh ground coffee will have been discharged and will place the funnel in a coffee brewer so that a batch of coffee may be brewed.

At any time when the grinder 5 is to be left unattended for a prolonged period, or if it is desired for any other reason to completely deactivate the grinder (e.g. if a foreign object jams the grinder) the operator should actuate the switch lever 10 so as to place the switch 18 in its "Off" position so that the grinder 8 cannot be energized unless a deliberate or positive manipulation of the switch lever 10 is performed.

Referring to FIGS. 5-7 of the drawings, a coffee grinder is indicated generally at 40 in FIG. 5 of the type which is suited for retail establishments. The grinder 40 has a hopper which typically will hold three pounds of coffee beans when full and operates to grind all of the beans in the hopper during each cycle of operation. The details of construction of the coffee grinder 40 do not constitute part of the present invention except to the extent that they relate to the electrical circuitry of the machine.

The hopper for the beans is located in the upper portion of the grinder body and access for loading is obtained by lifting the door or cover 41 which is hinged at 42. The grinder mechanism is located within the housing and is indicated in broken line at 43, being driven by an electric motor indicated in broken line at 44. The fineness or coarseness of the grind is adjustable and readily set by manipulating the exposed knurled knob 45.

The grinder 40 rests on a platform or base 46 which includes a bag-receiving area 47.

The ground coffee discharges from the grinder mechanism 43 into a chute 48. In use an empty bag, as indicated at 50 in broken line, will be placed under the chute 48 so as to receive the ground coffee.

Referring to FIG. 6, it will be seen that the chute 48 is provided at the back of its bottom end with a pair of rearwardly extending arcuate segments 51 which are parallel and spaced apart sufficiently to accept therebetween a portion 52 of a dog-leg arm 53 of a pendulum lever 54 which is pivotably mounted on a pin 55. The upper portion 56 of the lever 54 which is within the housing of the grinder 40 is substantially heavier than the generally vertical dog-leg portion 53 with a result that normally the pendulum lever 54 occupies the position indicated in broken line in FIG. 6 and in which the portion 52 extends into and between the segments 51. However, when a bag 50 is inserted in place to receive ground coffee as shown in FIG. 5 so as to come between the segments 51 and the portion 52 of the pendulum lever 54, the latter will be forced into the position shown in full line in FIG. 6 and will occupy that position until the bag 50 is removed. When the pendulum lever 54 is forced into the position shown in full line in FIG. 6 by the presence of the bag 50 (or other container), a pair of leaf springs 57—57 forming part of a switch 58, are allowed to rise and thereby permit two spring loaded or biased contacts 75, 76 of the switch 58 to close as will be discussed below in connection with FIG. 7.

Reference may now be had to FIG. 7 for a description of the control circuit by which the grinder 40 is controlled and operated. Normally, the grinder motor 44 will be energized from a source of 120 volts alternating current through a suitable connector cord (not shown) having a conventional three-prong connector plug on the end which is adapted to be inserted into a conventional three-socket receptacle. The live conductors are indicated at 60 and 61 in FIG. 7. The conductor 60 is connected with one terminal 62 of a three-position control switch of known type which is indicated diagramatically at 63 and which may correspond to the three-position switch 18 in FIG. 2. The conductor 61 is connected with one terminal of a single pole relay 64 and also with one terminal of the motor 44. When energized, the relay 64 closes or "latches in" the pair of normally open contacts indicated at 65 and 66.

The switch 63 has three terminals in addition to terminal 62, the three being indicated at 67, 68 and 70.

The switch 58 of FIG. 6 is indicated diagramatically in FIG. 7 as a double pole switch as having two pairs of terminals 71-72 and 73-74. The spring-biased contacts for the sets of terminals 71-72 and 73-74, respectively, are biased to their closed position but are normally held in their open position as shown in FIG. 7 by the pendulum lever 54. However, as mentioned above, when a bag 50 is inserted between the back of the chute 48 and the portion 52 of the pendulum arm, the spring loaded contacts 75 and 76 are released and allowed to close the switch 58.

In operation, the user loads the grinder 40 through the door 41 with the variety and quantity of coffee beans which are to be ground, typically one, two or three pounds. The knob 45 is set to the desired type of grind and a bag 50 is inserted as shown in FIGS. 5 and 6, thereby allowing the contacts 71-72 and 73-74 to close. The manipulating button 77 (FIG. 5) of the control switch 63 is now moved from its "Off" position and pivoted through its "On" or intermediate position to its "On plus Start" position. In moving to the "On" position the terminals 62, 70 are closed by the contact 78. When the button reaches the "On plus Start" position the terminals 67 and 68 are closed by the contact 80. It will be seen that upon the contact 80 closing against the terminals 67 and 68circuits will be completed to both the relay 64 and the motor 44. Energization of the relay 64 closes the contacts 65-66.

When the operator or user releases the switch button 77 from its momentary "On plus Start" position, it will automatically resume its intermediate or "On" condition wherein the contact 80 no longer interconnects the terminals 67 and 68. However, a circuit to the motor 44 will remain closed by way of the closed terminals 62 and 70 and the closed contacts 65 and 66. Accordingly, the grinder motor 44 will continue to drive the grinder mechanism 43. Upon removal of the bag 50, the switch 58 will be opened and the relay 64 will deenergized thereby opening the contacts 65 and 66 and deenergizing the motor 44.

It will be apparent from FIG. 7 that at any time when the user desires to completely shut off or inactivate the grinder mechanism 43 this may be accomplished by manipulating the button or lever 77 of the switch 63 to the "Off" position. For example, the user may have started to grind beans and then decided to change the fineness or coarseness of the grind. Another situation in which the user would want to shut off the grinder would be if he discovered the wrong kind of beans were being ground. In another case, the bag or other container might be broken or over-flowing. In still another case, the operator may want to grind only a portion of the beans and stop the grind without removing the bag.

Reference may now be had to FIG. 8 for a description of a control circuit for the grinder 40 which may be used as an alternative to the control circuit shown in FIG. 7. The live conductors from a source of 120 volts alternating current are designated at 81 and 82. The conductor 81 is connected with terminal 83 of a three position switch indicated diagramatically at 84 and which may correspond to the three position switches 18 and 63 of FIGS. 2 and 7, respectively. The conductor 82 is connected with one terminal of a double pole relay 85 and also with one terminal of the grinder motor 44. When the relay 85 is energized it closes or "latches in" two pairs of normally open contacts indicated at 86, 87 and 88, 90, respectively. The switch 84 has three terminals 91, 92 and 93 in addition to its terminal 83. Terminals 92 and 93 are closed by a contact 89. The switch 58 of FIG. 6 is represented diagramatically in FIG. 8 as a single pole switch indicated generally at 94 and having a pair of terminals 95 and 96. The spring-biased contact 97 for the terminals 95 and 96 is biased toward its closed position but is normally held in its open position shown in FIG. 8 by the pendulum lever 54. However, when a bag 50 is inserted between the back of the chute 48 and the portion 52 of the pendulum lever, the spring loaded contact 97 is released and allowed to close the switch 94.

In operation, the exposed manipulating button 77 (FIG. 5) for the control switch 84 is moved from its "Off" position and pivoted through its "On" or intermediate position to its "On plus Start" position. In moving to the "On" position the terminals 83 and 91 are closed by the contact 98. When the button reaches its "On plus Start" position the terminals 92 and 93 are closed by the contact 97. The switch 94 will normally have already been closed by placement of a bag to receive ground coffee. Upon closing of the contacts 92 and 93 by the contact 89, the relay 85 will be energized and the pairs of contacts 86, 87, 88 and 90 will be closed and the motor 44 energized. When the start button 77 is released the contact 89 opens the contacts 92 and 93. However, the motor 44 will continue to be energized until the bag is removed thereby opening the switch 94 and de-energizing the relay 85 whereupon the contacts 86, 87, 88 and 90 open. It will be seen that the motor can be stopped at any time by putting the switch 84 in its "Off" position and opening the contacts 83 and 91.

The control circuit of FIG. 8 has an advantage over the control circuit of FIG. 7 in that no load is placed on the bag switch 94 until the relay contacts 86, 87, 88 and 90 are closed. In the control circuit of FIG. 7, the full load passes through the double pole bag switch 58 before the relay contacts 65 and 66 are closed, which may cause the bag switch 56 to stick.

It will be understood that the invention is not limited to use with the two types of coffee grinders represented by grinders 5 and 40.

As previously indicated components of the control circuits above described can be of known commercial type and the following have been used successfully. The single pole relays 30 (FIG. 2) and 64 (FIG. 7) may be a Deltrol Relay Model 22487-70 and the double pole relay 85 (FIG. 8) may be a Deltrol Relay Model 870A 62A2A-120. The timer 19 (FIG. 2) may be a National Controls TBN-T1420-120. The switch 18 (FIG. 2) may be a McGill three-position control switch 861-0035 while the switches 63 (FIG. 7) and 84 (FIG. 8) may be a McGill three-position control switch 861-0045. The motor 8 (FIG. 2) may be a Baldor 34-4950-466 while the motor 44 (FIGS. 7 and 8) may be a Franklin 1091225701PR2.

What is claimed is:

1. In a coffee grinder having an electric grinder motor, a three-mode control circuit for energizing and deenergizing said motor, comprising, in combination, a three-condition control switch, a relay having at least one pair of openable and closable contacts, and conductors electrically interconnecting said motor, control switch and relay with a source of electric power, said control switch having (1) an "Off" condition in which it will reside until positively manipulated to another condition and in which said control circuit is completely de-energized, (2) an "On" condition in which it will reside until positively manipulated to another condition, and (3) a "On plus Start" condition wherein it actuates said relay and which it will occupy only so-long as manually retained therein and which upon release automatically resumes said "On" condition.

2. In the coffee grinder called for in claim 1, said three-position control switch has an exposed operating lever which is pivotably mounted for rocking movement between said "Off", "On" and "On plus Start" positions and which in its "On" position is intermediate its "Off" and "On plus Start" positions, said lever being biased to move from its said "On plus Start" position upon release and resume and remain in its said "On" position.

3. In the coffee grinder called for in claim 1, a timer interconnected in circuit relationship with said control switch and relay which energizes said relay only when said control switch is put in its said "On plus Start" condition and thereby closes said relay contacts and energizes said grinder motor for a predetermined period of time.

4. In the coffee grinder called for in claim 3, said timer deenergizes said relay at the end of said predetermined period of time whereupon said contacts are opened and said grinder motor is deenergized.

5. In the coffee grinder called for in claim 1, a second switch actuated by placement of a ground coffee container in position to receive ground coffee and interconnected in circuit relationship with said three-condition control switch and said relay, said second switch allowing said relay to be energized only when a ground coffee container is placed in coffee-receiving position on said coffee grinder.

6. In the coffee grinder called for in claim 5, said second switch being a double pole switch and said relay being a single pole relay.

7. In the coffee grinder called for in claim 5, said second switch being a single pole switch and said relay being a double pole relay whereby no currents flows through said second switch until the contacts of said relay are closed.

* * * * *